Nov. 25, 1969  H. A. KRAMER  3,480,325
VEHICLE SAFETY BELT MEANS FOR INFANT OR CHILD
Filed July 25, 1967  2 Sheets-Sheet 2
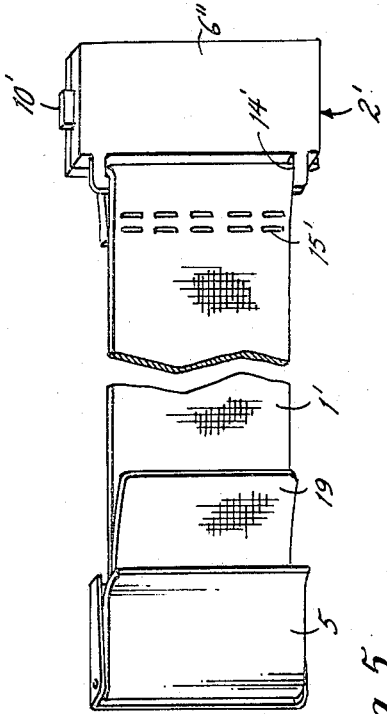
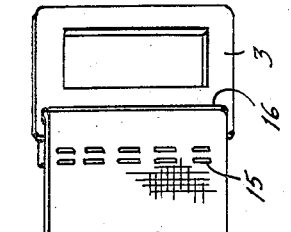
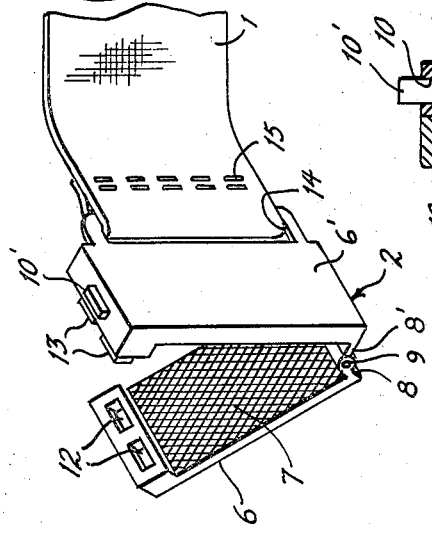
INVENTOR.
HOWARD A. KRAMER
BY McClure & Weiser
ATTORNEYS.

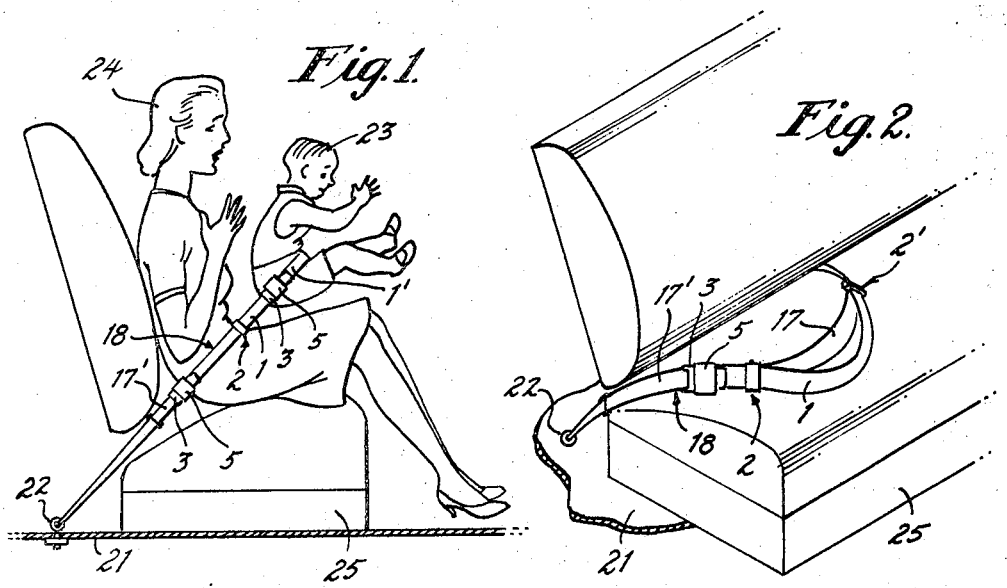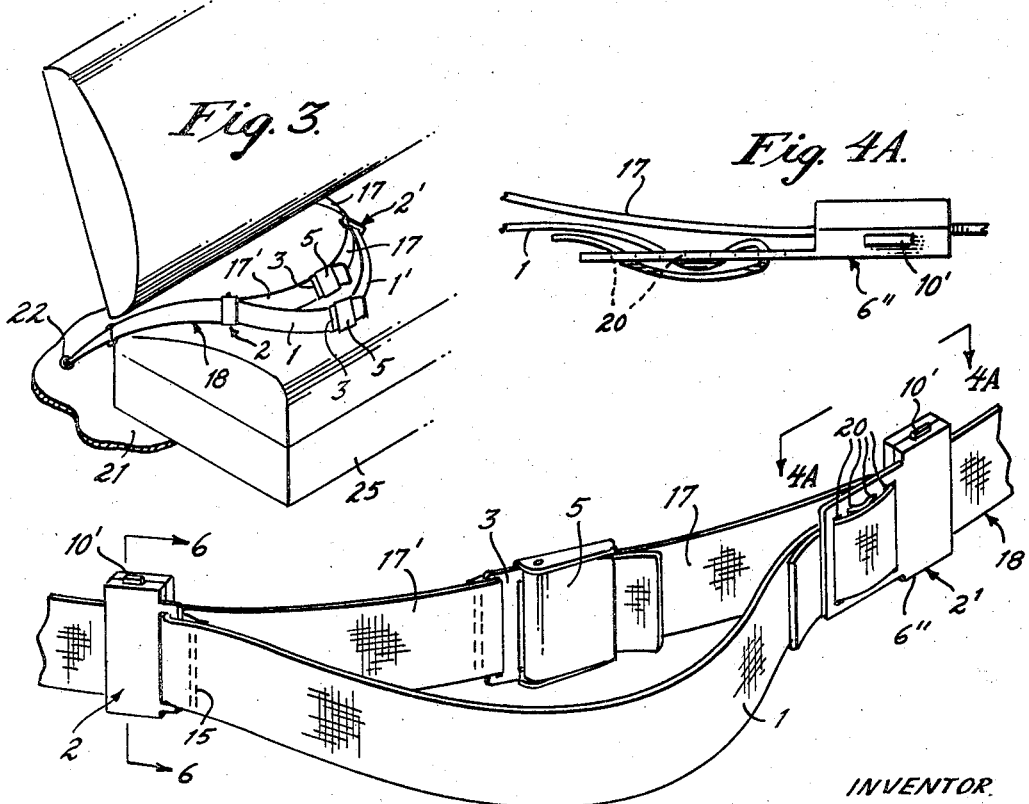

United States Patent Office 3,480,325
Patented Nov. 25, 1969

3,480,325
VEHICLE SAFETY BELT MEANS FOR INFANT OR CHILD
Howard A. Kramer, 12 Willow Terrace, Willow Terrace Apartments, Chapel Hill, N.C. 27514
Filed July 25, 1967, Ser. No. 655,853
Int. Cl. B60r 21/10; A47d 15/00; A62b 35/00
U.S. Cl. 297—385                                3 Claims

ABSTRACT OF THE DISCLOSURE

A safety seat belt means for restraining an infant or child on the lap of an adult seated in an air, land or sea vehicle, or the like, is provided by an auxiliary seat belt which is releasably attachable to at least one, and preferably both, of the individual belts of a conventional adult type lap seat belt means.

BACKGROUND OF THE INVENTION

Field of the invention

This invention relates to a safety seat belt means for use in vehicles moving on land, sea or air. In particular, it relates to a seat belt means for restraining an infant or child on the lap of, or at the side of, an adult, e.g., the mother, when the adult is seated in the vehicle and is restrained by a conventional type of seat belt means which has one pair of ends of a pair of safety belts secured to the vehicle and the other pair of ends adjusted and releasably locked across the lap of the adult.

Description of the prior art

Typical restraining means for children in vehicles are disclosed and claimed in patents of E. R. Dye, U.S. 3,028,-200; M. S. Pukish, Jr., U.S. 3,301,594; G. L. Bird et al., U.S. 3,125,375; and G. H. Muller et al., U.S. 2,908,324. The harnesses of the first two of these patents are attached to a strap passing vertically around the upright back of a vehicle seat. In the Bird et al. patent, the harness is secured to a strap secured to the floor of the vehicle and attached to the harness by a pair of snaps. The patent of Muller et al. teaches a seat vest jacket, much like a harness, provided with a pair of male ends of conventional locking type seat belt buckles and with an auxiliary female buckle attached to the male buckle end of the conventional belt. None of the above patents is concerned with restraining an infant or child held on the lap of an adult in a moving vehicle.

SUMMARY OF THE INVENTION

The present invention has as its principal objective providing a safety belt means and method for readily and quickly restraining an infant, child or animal on the lap of an adult seated and secured in place by a conventional safety belt means in the seat of an aircraft, automobile, boat, amusement ride, or the like. The novel safety belt means comprises an auxiliary safety belt means which is secured to the web of the conventional webbed seat belt on belts already fastened around the lap of the adult. The securing is achieved by an attachable means which quickly can be fastened to the web, as by a pair of hinged clamping jaws, and locked on. After one end of the auxiliary belt is fastened to the adult's safety belt, the auxiliary belt may be passed around the waist of the infant or child, or through a harness such as disclosed in the prior art patents. The free end of the auxiliary belt is then preferably attached in the same way as the first end to the adult's safety belt and drawn snug by adjustable means provided on the attaching means.

The auxiliary seat belt means readily can be attached at the time of use. Thereafter, it can be removed until required again, or it can be left permanently attached to the adult's seat belt means for frequent re-use. For example, in a commercial airliner, when a mother carrying an infant is seated in her seat and has her lap seat belt fastened around her in the usual position across her pelvic area, the stewardess can attach a pair of the auxiliary belts to the mother's belts at the sides of her lap. The infant is then placed on the mother's lap and the auxiliary belts buckled and snugged around the pelvic area of the infant. With the infant securely fastened in this manner, the mother has her hands free to tend to the infant's needs without the danger (particularly if the airliner should suddenly drop in an air pocket) that during a momentary release of her hold the infant might be thrown from her lap and be injured. On reaching the mother's destination, the auxiliary belts can readily be removed by the stewardess and stored for future similar use.

BRIEF DESCRIPTION OF THE DRAWING

The vehicle safety seat belt means for an infant or child and its use is illustrated in the accompanying drawing wherein:

FIGURE 1 is a side elevation view showing the seat belt means in use during a lurch of a child restrained to the seat belt of its mother and seated on the mother's lap in a moving vehicle.

FIGURE 2 shows a vehicle seat with a single belt form of the safety belt means of the invention attached to a single long belt of a conventional vehicle safety belt means having a long belt and a short belt at the buckled end.

FIGURE 3 shows a vehicle seat with a double belt form of the safety belt means of the invention attached to a conventional double-belted safety belt means of a vehicle.

FIGURE 4 shows a single belt form of the safety belt means of the invention attached to a conventional double-belted safety belt means for a vehicle. FIGURE 4A is a top view of FIGURE 4 taken on the line 4A—4A.

FIGURE 5 shows details of a double belt form of the safety belt means of the invention with one attaching end in unhinged position and one attaching end in locked position and having a conventional seat belt buckling means.

FIGURE 6 is a sectional view taken on the line 6—6 of FIGURE 4.

DESCRIPTION OF THE PREFERRED EMBODIMENT

The restraining of an infant or child held on the lap or in the arms of a mother during travel in a moving vehicle can be dangerous to both the infant or child and the mother during sudden deceleration of the vehicle or an unexpected change in direction of movement, as may be experienced particularly during an airliner flight. In the airliner, the mother usually is provided with a conventional seat belt as is every other adult passenger. When the mother is carrying an infant, one practice of the stewardess is to place the infant on the mother's lap and to pass and lock the mother's seat belts over the lap of the infant, thus securing the infant between the body of the mother and the seat belt. This method of restraining the infant can be harmful in the event that the airliner drops or lurches, since the seat belt presses against the infant and compresses the infant between the mother's body and the belt. The resulting sudden pressure can be injurious to the internal organs of the infant, or is at the least very uncomfortable.

The same danger exists whether the infant is riding in a similar way with the mother in an automobile, in a boat or on an amusement ride. In an automobile, the mother usually straps herself with her safety seat belt and holds the infant on her lap outside the seat belt. In the event that the mother falls asleep or is detracted from the infant during an emergency deceleration of the automobile, the infant can be injured by being thrown forward from the mother's arms.

The present invention overcomes the above dangers and permits the mother to have a more enjoyable trip by providing an auxiliary seat belt means which is readily attached to and detached from the mother's conventional seat belt and which permits the mother to have her arms and hands free.

The auxiliary safety seat belt means of the invention comprises a web 1, or webs 1, 1', having a releasable attaching means, e.g., 2, on at least one end of the web. Preferably, the web 1, as shown in the embodiments of FIGURES 2 and 4, has attaching means 2, 2', one at each end of the belt. Alternatively, as shown in the embodiments of FIGURES 1, 3 and 5, the other end of each belt 1 of a pair of webs 1, 1', is attached to one part, male 3 or female 5, of a conventional seat belt buckle means 3, 5. Each attaching means 2, 2' comprises a pair of jaws 6, 6', or 6, 6''. The jaws preferably are of metal and are provided with knurling 7, or otherwise made non-slip. Jaw 6 is provided at one end with an offset 8 which is hinged to the offset 8' on jaw 6' by hinge pin 9. Jaw 6 is provided at its other end with one part, e.g., the female, of a spring lock 10 which is provided with apertures 12 adapted to receive the prongs 13 of the other part, e.g., the male, of the locked provided on jaw 6'. The lock 10 is provided with a push-button unlatching means 10'. Jaw 6' is provided on its right side with a vertically elongated aperture 14 through which is passed one end of the web 1. The end of web 1 is secured around the jaw 6' by stitching 15. Jaw 6'' is provided similarly on its left side with a vertically elongated aperture 14' through which the web 1' is passed and secured by stitching 15'. The other end of the web 1 is passed through the web-attaching aperture 16 of the male end 3 of the conventional seat buckle 3, 5, as shown at the center left of FIGURE 5. The other end of web 1' is passed through internal web adjusting and locking means of the female end 5 of the seat buckle 3, 5 of FIGURE 5.

To use an embodiment of the seat belt of the invention, the attaching means is opened substantially as shown at the left of FIGURE 5. The jaw 6 of attaching means is slipped under the web 17 of a conventional seat belt 18, either before or after the belt 18 has been secured across the lap, or pelvic area, of a seated adult 24, positioned on a seat 25 substantially as shown in FIGURE 1. The jaws 6, 6'' are closed and secured by the lock 10. The web is securely gripped by the jaws 6, 6' substantially as shown in FIGURE 6. When two auxiliary belts are used, as is illustrated in FIGURES 1 and 3, each attaching means of each belt is fastened to the web or webs of the conventional seat belt substantially as described. The attaching means 2, 2' are spaced along the length of web or webs in such a way that the body of the infant or child to be restrained can readily be accommodated between the auxiliary seat belt and the conventional seat belt 18. When a double belt means, such as that shown in FIGURE 5, is used, the belts are buckled together and the web 1' drawn snug by tugging on the end 19 of the web. When a single belt is used, as shown in FIGURES 2 and 4, the attaching means 2 is fastened to the web 17 or webs 17, 17', web 1 is then drawn snug about the infant's lap, and attaching means 2' is attached to web 17 or webs 17, 17'. Also, additional cinch-type buckle apertures 20 can be provided on the jaw 6'' through which the web 1 can be looped, or cinched, to draw it snug and to secure it, as shown in FIGURE 4A.

After the infant or child 23 is secured on the lap of the adult, the adult is restrained from forward movement by the conventional seat belt 18, and the infant is restrained from forward movement by the auxiliary safety belt means of the invention. The adult, e.g., the mother, has her arms free to adjust her own belt and belt of the infant. The adult can also quickly release himself, or herself, from the seat belt and simultaneously, if necessary, can release the infant from its seat belt. This permits both the adult and the infant quickly to leave the seat should an emergency requiring this action arise.

The auxiliary seat belt means of the invention can be used in various sets with the conventional seat belt means 18. For example, in FIGURE 1 a pair of auxiliary belts having webs 1 and 1' are shown attached to the elongated web 17 of a conventional seat belt 18 means which is buckled close to the floor 21 by buckle means 3, 5 with one end of the female end 3 of the buckle secured by a short web 17' to bolting means 22 which is bolted to floor 21. The two buckle ends 3, 5 of the auxiliary belts are buckled together at the side of the infant or child 23.

In FIGURE 2 is shown (without the adult and infant) an auxiliary safety belt means having a single web 1 and two attaching means 2, 2' attached to a long web 17 of a conventional seat belt 18.

In FIGURE 3 is shown (without the adult and infant) an embodiment in which a pair of about equally long conventional seat belt webs 17, 17' have been buckled together as they would be when used with the adult restrained thereby. A pair of auxiliary belts having webs 1, 1' are shown attached, one to each of the conventional webs 17, 17', and buckled together as they would be when used with the infant restrained thereby.

In FIGURE 4 is shown an embodiment wherein a single auxiliary belt having a web 1 is attached by two attaching means 2, 2' to the webs 17, 17' of a conventional seat belt 18, of which fragments only are shown.

While the auxiliary safety seat belt means has been illustrated with a conventional lap seat belt, the belt of the invention can also be attached and used in conjunction with a combined shoulder-lap strap type of seat belt. The auxiliary safety belt means can be attached either to the lap portion of the belt or to the shoulder portion, or to both, as will be clear to one familiar with the use of seat belts in view of the description and drawing hereof.

Also, while the terms infant or child have been used generally in the description, it is to be understood that the terms are intended to include both a baby of very tender age to a child of any age seated on the lap of an adult.

The auxiliary seat belt can also be used in conjunction with a harness which fits over the torso of the infant or child such as is disclosed in the patents discussed above. The web of the auxiliary safety belt means of the invention can be threaded through the known harness and the attaching means 2, 2' secured to the conventional seat belt means 18 in the manner of any of the embodiments described herein.

Also, the auxiliary seat belt means can be used to restrain an animal, e.g., a cat or dog, by passing the web of the auxiliary safety belt means through its known harness means in a similar manner.

It will be clear to one skilled in the seat belt art that various forms of buckle-type locks can be used to practice the invention. Also, it will be obvious that other types of quick-attaching, quick-releasing, non-slip attaching means 2, 2' can be used. For example, in another embodiment of attaching means, snaps may be used by constructing the conventional seat belt web with a multiplicity of male or female, preferably the male, ends of the snaps in situ. The mating ends of the snaps are then constructed similarly in the web of the auxiliary belt. The auxiliary belt can then be snapped into place on the conventional seat belt. The number and strength of the snaps required to withstand the stress of the infant's body on the sides of the snaps can be readily determined.

The attaching means 2 as shown in FIGURES 5 and 6 are constructed to have the space between the jaws 6, 6' sufficiently narrow to permit the knurling 7 to tightly grip the web 17. The offsets 8, 8' and the locking means, lock 10 are constructed accordingly. The metal of the attaching means can be coated with hard rubber or with a plastic material, e.g., polyvinylchloride, to keep it free of corrosion and to make it more non-slip in character.

The webs 1, 1' can be constructed of the usual type of webbing used in construction of conventional seat belts which meet the SAE and Federal specifications, e.g., nylon webbing which exceeds 6,000 pounds tensile strength. The length of the webbing can be readily determined and sufficient excess provided to permit adjustment to different sized torsos of different infants and children.

The locking means at the open end of the attaching means can be any form of quick-latching, quick-releasing means, e.g., such as are used in closing attache cases, trunks, and the like.

It is to be understood that the illustrations and descriptions of the auxiliary safety seat belt means herein are by way of example and that modifications may be made therein while retaining all or some of the advantages and benefits of this invention.

The claimed invention:

1. The combination consisting essentially of an auxiliary safety belt means for an infant or child and a single conventional lap-type primary seat belt means for an adult in an air, land, water vehicle or amusement ride and the like, said single primary seat belt means comprising a pair of primary webs, each primary web having a free end with one part of a two-part locking means attached thereto and each primary web having its other end secured to said vehicle or a secured part thereof.

said auxiliary safety belt means comprising at least one auxiliary web means having a first end and a second end, and quickly releasable attaching means fastened to each end of said auxiliary web means, each of said attaching means being adapted to pass around and to lockingly engage a primary web of said primary seat belt perpendicularly to its length and being positioned around and being temporarily secured to the sides and edges of at least one of the primary webs of said primary seat belt means along the length thereof and intermediate to the locking means and the secured end with the inner surface of the auxiliary web means positioned adjacent to the exterior surface of said primary web of said primary seat belt means for holding an infant or child therebetween in a secured position on the lap of an adult.

2. The auxiliary safety seat belt means of claim 1 wherein said means comprises a pair of said auxiliary webs, each of said auxiliary webs having a first end and a second end, each of said auxiliary webs being provided with releasable attaching means at the first end and each of said auxiliary webs being provided with locking means at the second end, said locking means being adapted to lock said second ends together, said pair of auxiliary webs when in locked position having sufficient total length to pass over the body of an infant around the pelvic area thereof seated upon the lap of an adult between the exterior of the primary webs of the primary seat belt means and within the confines of the auxiliary safety seat belt means with both attaching means of the pair of auxiliary web means attached to at least one of the webs of the primary seat belt means.

3. The safety belt means of claim 1 wherein each of said attaching means comprises a pair of hinged jaws secured to the end of said auxiliary web means by fastening means, said jaws being hinged to swing on opening and closing in an arc perpendicular to the length of the auxiliary web means, said jaws being adapted to retain in secured nonslip position the web of a primary belt therebetween when closed, and locking means on said jaws adapted to hold the attaching means in said secured position.

References Cited

UNITED STATES PATENTS

| | | | |
|---|---|---|---|
| 1,848,313 | 3/1932 | Buresh | 297—385 X |
| 2,804,313 | 8/1957 | Gilles | 182—3 X |
| 2,908,324 | 8/1959 | Muller et al. | 297—389 |
| 3,186,762 | 6/1965 | Lucas | 297—385 |
| 3,251,108 | 5/1965 | Harrison | 24—166 |
| 3,310,034 | 3/1967 | Dishart | 297—385 X |
| 3,316,017 | 4/1967 | Knight | 297—385 |

FOREIGN PATENTS 1,010,272   11/1965   France.

JAMES T. McCALL, Primary Examiner

U.S. Cl. X.R.

24—170